Figure 1:
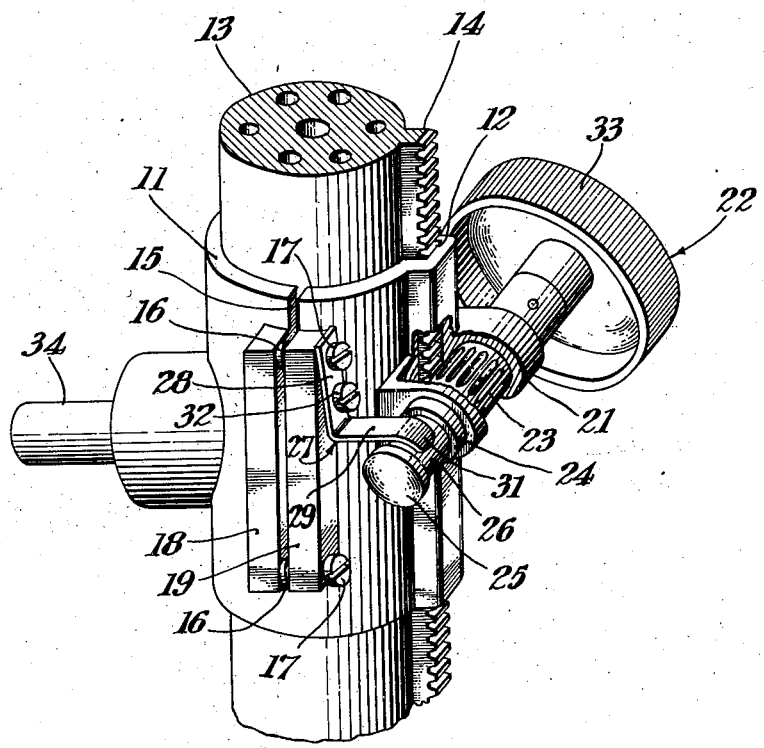

Oct. 28, 1947.  J. X. MERKT  2,429,696
RACK AND PINION MECHANISM
Filed Oct. 26, 1944

INVENTOR
JOSEPH X. MERKT
BY
Pennie, Davis, Marvin & Edmonds
ATTORNEYS

Patented Oct. 28, 1947

2,429,696

UNITED STATES PATENT OFFICE 2,429,696

RACK AND PINION MECHANISM

Joseph X. Merkt, Louisville, Ky., assignor to Air Reduction Company, Incorporated, a corporation of New York Application October 26, 1944, Serial No. 560,486

3 Claims. (Cl. 74—422)

1

This invention relates to gas torch machines and more particularly to the holders for securing the torch on the machine support.

A gas torch body is not always exactly uniform in diameter. Thus, with prior types of holders, the inner diameter of the sleeve designed to frictionally contain the torch has to be the size of the torch through its slightly large portions with the result that the torch becomes loose in the holder when the average or small portions of the torch are aligned with the holder. In other words, where the frictional engagement between the holder and torch is relied upon to maintain the torch in its adjusted position, friction is only sufficiently present when torch portions of the large diameter are within the holder. When at a point in the adjustment, the portions of small diameter of the torch are reached, there is no friction to retain the torch and, consequently, the torch drops free and out of adjustment, the gearing not resisting sufficiently to hold up the torch.

It is an object of the present invention to provide an adjustable torch holder for torch machines in which the torch can be adjusted to any number of positions in the torch holder and be automatically retained in those positions.

It is another object of the invention to provide a torch holder in which the sleeve body adapted to receive the torch is sufficiently large to permit easy sliding movement of the torch through the sleeve and one in which slight irregularities in the size of the torch from one portion to another portion will not bind or free the torch within the holder.

According to the invention, the torch holder includes a slit sleeve body or split clamp which is of such diameter as to permit free movement of the torch through the holder for all diameters thereof and dependency is made upon the wheel and pinion arrangement for retaining the torch in the adjusted position. In the form of the invention shown, an extension is provided upon the pinion shaft, which engages with the rack of the torch, to provide a bearing or braking surface. A leaf spring is connected to the sleeve body and extends into frictional engagement with the bearing surface whereby to brake the pinion shaft in any of its positions of adjustment. Shims are located in the slit so that the screws which serve to tighten the sleeve can be screwed down tight without having the holder grip the torch.

For better understanding of the invention, reference may be had to the following description taken in connection with the accompanying drawing, in which the figure is a perspective view

2 of the adjustable torch holder embodying the features of the present invention.

Referring now to the drawing, a sleeve-like body or split clamp 11 having a rack recess 12 is adapted to receive a torch 13 having the usual rack bar 14. Sleeve 11 is split as shown at 15 and within this slit are provided shims 16 through which clamping screws 17 extend. The clamping screws are threaded into flanges or projections 18 and 19 and, when the screws are tightened against the shims, sufficient slack is allowed in the sleeve to permit free sliding movement of the torch 14 through the sleeve. The proper size shim must be used to secure this result. When these shims have been selected, screws 17 can be rendered tight in the flanges 18 and 19.

On the sleeve-like body 11, adjacent the rack-receiving portion 12, is a bracket 21 which supports a wheel and pinion arrangement 22 so that a pinion 23 thereon is in working engagement with the torch rack 14.

This arrangement 22 includes a shaft 24 and a round extension 25 thereon extending laterally to a location adjacent the flanges 18 and 19 and having a bearing or braking surface 26.

On the flange 19 there is connected a leaf spring 27 having a vertically-extending portion 28 secured to the flange 19 by the upper screw 17 and a horizontally-extending portion 29 extending into frictional engagement with the bearing surface 26 of the extension 25. To increase the area of the contacting surface of the portion 29, the latter is preferably curved as indicated at 31.

To adjust the intensity of the frictional engagement of the portion 29 with the surface 26, there is provided a second screw 32 extending through the vertically-extending portion 28 and into the flange 19. By adjusting the screw 32, the horizontal portion 28 of the spring is given more or less frictional engagement with the bearing surface 26. A wheel 33 is carried on the shaft 24 to effect the manual turning of the shaft and the adjustment of the torch 13 through the sleeve 11. This wheel, and so much of the shaft which extends through the bracket 21, is common on the standard torch machines but the extension 25 upon the shaft 24 and the leaf spring for maintaining the shaft in any position to which it is adjusted and thereby maintaining the torch in its adjusted position is the novel feature of the present invention. The usual trunnion 34 or attaching part for the holder is provided on the sleeve 11.

Instead of a leaf spring, the friction engaging means may take the form of a brake coupling adapted to extend about the extension. Also, the arrangement can be such that the leaf spring can be arranged to bear upon the periphery of the wheel if the torch is heavy and greater braking effect is necessary.

What is claimed is:

1. A holder for adjustably holding a gas torch or other cylindrical object having a rack thereon, comprising a split clamp having an opening therethrough in which the cylindrical object is axially movable, an adjustment for regulating the clamp to control the size of said opening and the friction of the cylindrical object in the opening, a channel in the side wall of said opening for receiving the rack on the object, and actuating means for moving the object axially in the holder, said actuating means including a pinion in position to mesh with the rack in said channel, an axle for the pinion, an element for rotating the pinion, a braking surface on a part of the actuating means and constructed and arranged to rotate with the pinion, and a brake for opposing rotation of the pinion, said brake comprising a friction element connected with the torch holder and having spring means for holding the friction element in contact with the braking surface of said actuating means.

2. A holder for adjustably holding a gas torch or other cylindrical object having a rack thereon, comprising a split sleeve having an opening therethrough in which the cylindrical object is axially movable, adjusting means for the split sleeve, the split sleeve being adjusted by said means so that its internal diameter is not sufficiently small to cause the sleeve to frictionally hold the cylindrical object in every position to which it may be adjusted in the sleeve, a channel in the side wall of said opening for receiving the rack on the object, and actuating means for moving the object axially in the holder, said actuating means including a pinion in position to mesh with the rack in said channel, an axle for the pinion, an element for rotating the pinion, a braking surface on a part of the actuating means and constructed and arranged to rotate with the pinion, and a brake for opposing rotation of the pinion, said brake comprising a friction element connected with the torch holder and having spring means for holding the friction element in contact with the braking surface of said actuating means.

3. A holder for adjustably holding a gas torch or other cylindrical object having a rack thereon, comprising a split sleeve having an opening therethrough in which the cylindrical object is axially movable, means for contracting the split sleeve about the cylindrical object, a shim between the meeting edges of the split sleeve adapted when the sleeve is contracted about the cylindrical object by said means to give the sleeve an internal diameter which is not sufficiently small to cause the sleeve to frictionally hold the cylindrical object in every position to which it may be adjusted in the sleeve, a channel in the side wall of said opening for receiving the rack on the object, and actuating means for moving the object axially in the holder, said actuating means including a pinion in position to mesh with the rack in said channel, an axle for the pinion, an element for rotating the pinion, a braking surface on a part of the actuating means and constructed and arranged to rotate with the pinion, and a brake for opposing rotation of the pinion, said brake comprising a friction element connected with the torch holder and having spring means for holding the friction element in contact with the braking surface of said actuating means.

JOSEPH X. MERKT.

REFERENCES CITED

The following references are of record in the file of this patent:

UNITED STATES PATENTS

| Number | Name | Date |
|---|---|---|
| 401,512 | Oehlmann | Apr. 16, 1889 |
| 866,278 | Hemenway | Sept. 17, 1907 |
| 1,780,172 | Cramer | Nov. 4, 1930 |
| 2,096,953 | Barrett | Oct. 26, 1937 |
| 1,359,530 | Richardson | Nov. 23, 1920 |
| 2,270,242 | Anderson | Jan. 20, 1942 |
| 2,294,848 | Thompson | Feb. 18, 1919 |
| 1,786,934 | Briggs | Dec. 30, 1930 |
| 762,096 | Seymour | June 7, 1904 |
| 1,587,092 | Van Dresser | June 1, 1926 |
| 1,727,984 | Johnson | Sept. 10, 1929 |